United States Patent
Guigné et al.

(10) Patent No.: US 9,030,914 B2
(45) Date of Patent: May 12, 2015

(54) DISCRETE VOLUMETRIC SONAR METHOD AND APPARATUS FOR SUB-SEABED SURVEYING

(75) Inventors: Jacques Y. Guigné, Paradise (CA); Nicholas G. Pace, Bath (GB); Adam Gogacz, Pouch Cove (CA); Gary Dinn, Paradise (CA)

(73) Assignee: PanGeo Subsea, Inc., St. John's, NL (CA)

( * ) Notice: Subject to any disclaimer, the term of this patent is extended or adjusted under 35 U.S.C. 154(b) by 631 days.

(21) Appl. No.: 13/438,765

(22) Filed: Apr. 3, 2012

(65) Prior Publication Data

US 2013/0258811 A1    Oct. 3, 2013

(51) Int. Cl.
| | |
|---|---|
| *G01S 15/00* | (2006.01) |
| *G01S 7/52* | (2006.01) |
| *G01S 7/521* | (2006.01) |
| *G01S 7/536* | (2006.01) |
| *G01S 15/89* | (2006.01) |
| *G01S 15/88* | (2006.01) |
| *G01V 1/20* | (2006.01) |
| *G01V 1/38* | (2006.01) |

(52) U.S. Cl.
CPC ............ *G01S 7/52003* (2013.01); *G01S 7/521* (2013.01); *G01S 7/536* (2013.01); *G01S 15/8904* (2013.01); *G01S 15/88* (2013.01); *G01V 1/20* (2013.01); *G01V 1/3808* (2013.01); *G01V 1/3835* (2013.01); *G01V 1/3852* (2013.01); *G01V 2200/12* (2013.01); *Y10S 367/90* (2013.01); *Y10S 367/902* (2013.01)

(58) Field of Classification Search
USPC .............................. 367/910, 900, 88, 87, 902
See application file for complete search history.

(56) References Cited

U.S. PATENT DOCUMENTS

| | | | | |
|---|---|---|---|---|
| 3,531,764 | A * | 9/1970 | Hill ............................... | 367/125 |
| 4,622,657 | A * | 11/1986 | Clare ............................ | 367/129 |
| 6,836,449 | B2 * | 12/2004 | Raykhman et al. ............. | 367/99 |
| 2003/0053373 | A1 * | 3/2003 | Erikson ........................... | 367/88 |
| 2010/0157736 | A1 * | 6/2010 | Riordan et al. .................. | 367/88 |
| 2010/0259269 | A1 * | 10/2010 | Cho et al. ....................... | 324/365 |
| 2011/0013484 | A1 * | 1/2011 | Coleman et al. ................ | 367/88 |
| 2013/0148471 | A1 * | 6/2013 | Brown et al. ................... | 367/88 |

* cited by examiner

*Primary Examiner* — Isam Alsomiri
*Assistant Examiner* — Hovhannes Baghdasaryan
(74) *Attorney, Agent, or Firm* — Richard A. Fagin

(57) ABSTRACT

A method for imaging formations below the bottom of a body of water includes imparting acoustic energy into the formations along a predetermined length swath at a selected geodetic position. Acoustic energy reflected from the formations is detected along a line parallel to the length of the swath. The selected geodetic position is moved a selected distance transverse to the length of the swath. The imparting acoustic energy, detecting acoustic energy and moving the geodetic position are repeated until a selected distance transverse to the length of the swath is traversed. The detected acoustic energy from all the selected geodetic positions is coherently stacked. The detected acoustic energy is beam steered to each of a plurality of depths and positions along the length of the swath to generate an image for each such depth and position.

19 Claims, 11 Drawing Sheets

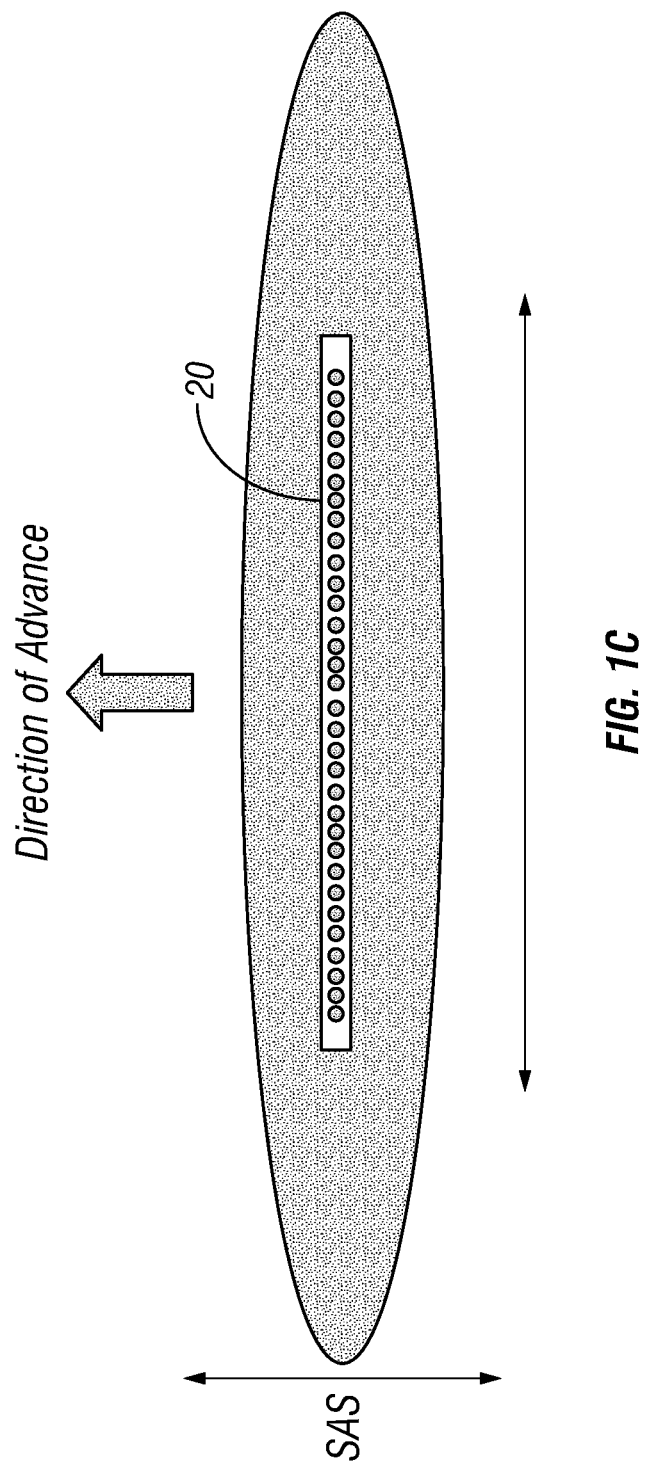

DISCRETE VOLUMETRIC SONAR METHOD AND APPARATUS FOR SUB-SEABED SURVEYING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The invention relates generally to the field of imaging shallow formations and discrete seismic anomalies below the bottom of a body of water. More specifically, the invention relates to methods and apparatus for acquiring higher resolution images below the bottom of a body of water than is currently possible using devices known in the art.

Offshore geotechnical engineers preferably use reliable and representative borehole and/or cone penetrometer data for marine geotechnical (sub-bottom formation) assessment. The collection of these forms of samples, both physical or cone penetrometer-derived data is expensive and limited in its spatial representation of what is the true nature of the sub-bottom. In addition, the samples recovered may have been altered or biased during their collection. These possibilities introduce uncertainties, often putting into question the reliability of the physical boundaries displayed in cross-sections of the samples recovered or in the interpretation of the penetrometer profiles and values. Without additional verification and multiple or dense spot sampling, such geotechnical physical samples remain in effect a one-dimensional input to site investigations.

Both lateral and discrete discontinuities within the sub-bottom are important for offshore engineering and construction, risk mitigations. These discontinuities arising from complex geological sedimentary, tectonic, and glacial processes are also factors that influence the quality and dependability of physical core retrieval. These discontinuities in the sub-bottom can take the form of soft sedimentary lenses, boulder/cobble erratics, glacial tills, hard pans, fluidized discontinuous mud layers, gas hydrates, gas-charged sediments and periglacial frozen soil features. The resultant core samples may not be capable of capturing and retaining such materials or produce undisturbed samples thereof at the surface. Soft sediments become compressed during core extraction and depending on the extraction conditions may fluidize some of the materials in the core sample. This means an incorrect stratigraphic interpretation could occur but such would not be known or suspected when observing the core sample.

In addition it is well recognized in geophysical literature that imaging of lateral stratigraphy and showing only major sedimentary changes is not always indicative of the true stratigraphic organization of facies. Minor banding may be representative of true layering or such may be minor, highly localized internal sediment banding. In addition there may be disruptive blockages by large particulates or the inclusion of highly dense fragments. These blockages and or inclusions could be misinterpreted as belonging to a bedrock formation that does not exist at that particular depth. Without a multiplicity of physical cores taken in close proximity, the true lateral extent and nature of these boundaries may not be known.

To supplement physical sampling methods there is wide use of various geophysical acoustic and seismic based surveying techniques to map the dominant sub-bottom features' specular reflective properties. These techniques generally rely on having continuity in sub-bottom formation "horizons" or layers (i.e. acoustic/seismic boundaries). However, the sub-bottom is not composed only of laterally smoothly varying spatial features but also include widely distributed scattering and attenuating sedimentary and bedrock features or characteristics which translate into back-scattered, diffuse, non-specular acoustic reflections. Such diffuse reflections are generally interpreted as noise and subsequently filtered out of the data by conventional processing techniques. It is desirable that such sub-bottom texturally induced responses be ultimately captured and visualized in a coherent manner and interpreted in sub-bottom acoustic/seismic data.

Techniques known in the art cannot acoustically/seismically image the surrounding inhomogeneous sediment conditions such as required by offshore installation engineers and for pile or drill emplacements. Existing sonar techniques cross-reference poorly their data responses because such data are captured through continuously moving acoustic data acquisitions with sparse coverage with respect to the order of the wavelength of the intended features to be imaged.

Acoustic imaging methods known in the art, which are used extensively in connection with marine drilling, coring and in situ cone sensing remain isolated within their own prime physical interactions with the water sub-bottom. There has been a demand from the marine geotechnical community for better tools and more reliable correlations between the various data sets physically collected. Several developments have been noted in the domain of high resolution geophysics. See, for example, "Acoustic Sub Surface Interrogator (ASI), Guigné, 1990, U.S. Pat. No. 4,924,449 and, 'Wide Area Seabed Analysis", Guigné, 2010, U.S. Pat. No. 7,715,274. The foregoing patents describe three-dimensional mapping of geophysical parameters of the near sub-surface with greater accuracy and detail than has proven to be attainable using conventional seismic site surveying procedures The ASI referenced above, includes various configurations of a positional transducer array on a stationary platform resting on the water bottom. The array coherently transmits signals with a signal having been specifically selected and programmed in terms of power, center frequency, beam-width, bandwidth, shape and incident angle. A positional receiver array on the platform captures the returned signals. Sub-surface acoustical properties, at the location of deployment, are identified through beamforming from various directional aspects within the platform footprint, then various geotechnical correlations are predicted from the processed returned signals. A calculation of the speed of sound in the sub-bottom, at the site of investigation, is introduced through the use of two extra orthogonal data line collections, which follow traditional seismic data acquisition routines involving time migration protocols. Subsequently, sub-bottom positions within a selected volume are then interrogated using well understood processing algorithms based on synthetic aperture sonar principles involving combined continuously gathered, successive transmissions coherently acquired along a precise data acquisition track in order to increase the azimuth (along-track) resolution. An interpretation is made of acoustical reflected and back-scattered properties between locations profiled, to develop a distribution model of the specular and diffused properties within a volume in the sub-bottom.

In addition there are numerous sub-bottom profilers on the market that utilize the well known and practiced art of synthetic aperture sonar, wherein independently of the acoustic signal generation and recording, there is an exacting and demanding continuous geodetic position requirement and orientation of the system for sub-bottom features to be coherently imaged on and be constructively produced. This continuous motion is typically measured using a high-grade inertial navigation system ("INS") whose clock is synchronized with that of the acoustics sensors. The INS data are typically collected at the highest possible refresh rate, which typically ranges from 10 to 25 Hz. Without occasional input of absolute geodetic position information at selected time intervals, an INS system drifts during long term usage hence sonar profiling systems involving Synthetic Aperture Sonar architectures depend on and are fallible to their INS systems which periodically or continuously require corrections for drift.

There continues to be a need for high resolution sub-bottom imaging methods and apparatus.

SUMMARY

One aspect of the invention is a sub-bottom sonar imaging apparatus. The apparatus includes a carriage assembly having mounted thereon at least one acoustic transmitter, at least one acoustic receiver mounted proximate the transmitter. A line array of acoustic receivers is mounted on the carriage assembly in a direction transverse to a direction of motion of the carriage assembly. A position determining transponder is mounted on the carriage assembly. A plurality of position determining transponders is disposable at spaced apart positions and is configured to communicate with the transponder mounted on the carriage assembly. At least two line arrays of acoustic receivers are disposable substantially orthogonally on the bottom of a body of water. The apparatus includes means for moving the carriage assembly to selected positions above the water bottom. A signal detection and processing unit is configured to coherently stack and beam steer signals detected by the line array of acoustic receivers mounted on the carriage assembly. The signal detection and processing unit is further configured to record signals detected by the line arrays of acoustic sensors deployable on the water bottom and signals detected by at least one acoustic receiver mounted on the carriage assembly.

A method for imaging formations below the bottom of a body of water according to another aspect of the invention includes imparting acoustic energy into the formations along a predetermined length swath at a selected geodetic position. Acoustic energy reflected from the formations is detected along a line parallel to the length of the swath. The carriage assembly after detecting signals at a known geodetic position is moved a selected distance transverse to the length of the swath. The imparting of acoustic energy, detecting of acoustic energy and moving of the carriage assembly to a successive predefined geodetic position are repeated until a selected distance transverse to the length of the swath is traversed. The detected acoustic energy from all the selected geodetic positions is coherently stacked. The detected acoustic energy is beam steered to each of a plurality of depths and positions along the length of the swath to generate an image for each such depth and position.

Other aspects and advantages of the invention will be apparent from the description and claims which follow.

BRIEF DESCRIPTION OF THE DRAWINGS

FIG. 1C shows a synthetic aperture sonar pattern formed by motion of a signal acquisition beam on the vehicle of FIG. 1A.

DETAILED DESCRIPTION

Figure 1A:
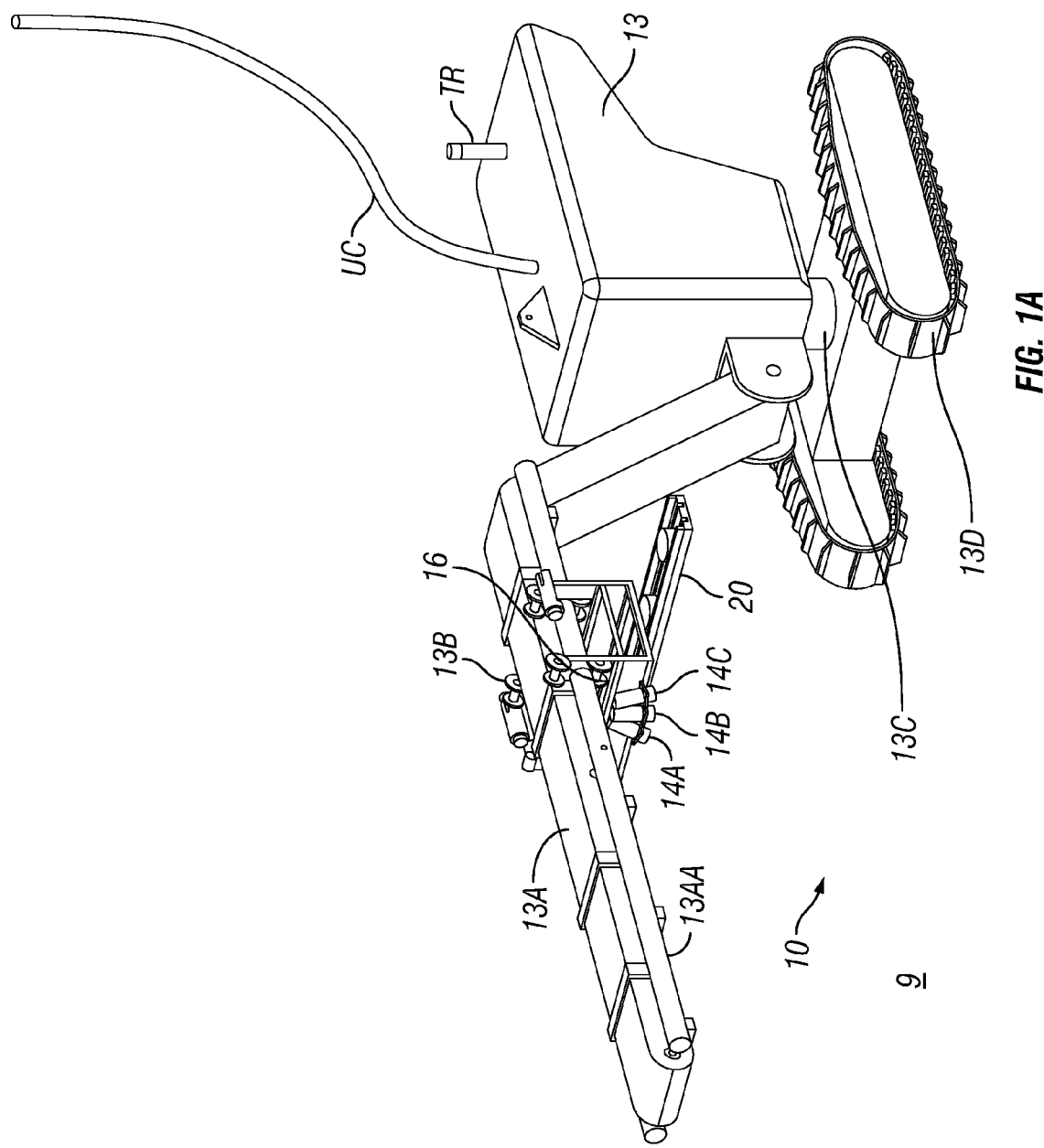
FIG. 1A shows an example signal acquisition vehicle.

The present description will begin with an overview of an apparatus and method for acquiring high resolution sub-bottom acoustic signals and processing such signals into an image of the sub-bottom. More detailed example apparatus and description of example signal processing techniques will follow thereafter.

The apparatus used herein may be an assembly of four principal components:

1) a circular or other shaped wire grid template or high accuracy set of seabed positioning beacons, for example acoustic or optical beacons;

2) a carriage assembly which supports an x and y-axis translation of broadbeam, high intensity acoustic transmitter(s) with substantially co-located hydrophone receiver(s) along with associated supporting electronics, power supply, signal generators, data acquisition and signal storage, conditioning and processing devices. The carriage may also include a line array of hydrophones or similar acoustic receivers mounted thereon in a direction transverse to the direction of motion of the carriage during signal acquisition.

3) a pair of orthogonally oriented linear multi-channel receiver (e.g., hydrophone) arrays for placing directly on the seabed; and 4) a ROV or other underwater remotely controllable vehicle to lift and accurately place the carriage assembly onto the water bottom through a virtually structured framework or onto the physical components of a mechanical/physical template.

The foregoing components may include a signal processing unit disposed on the carriage assembly or other position (e.g., in the ROV) to actuate the transmitter as further explained below and to record and/or process signals detected by the various receivers into an image of the sub-bottom. The imaging obtained from the foregoing components may include a continuously constructed, three-dimensional cellular view of the sub-bottom. Using the components as more fully described below, such cellular view will be typically 5 meters wide, 5 meters long and approximately 30 meters deep (below the water bottom). The principal physical components of the apparatus may further include the following.

A stable platform in the form of the carriage assembly enables deployment of sensors at a nominal 2 meters to 3.5 meters altitude above the water bottom. The broadbeam, high-intensity acoustic transmitter may comprise three, linear frequency modulation chirp projectors. The chirp projectors may be mounted on the carriage and oriented to form a swath of acoustic energy projected into the sub-bottom. The chirp projectors may each have 4.5-14.5 kHz bandwidth, and typically each chirp projector provides a uniform 5 meter wide swath of acoustic energy on the water bottom.

One example of the receiver array may be mounted on the carriage and may be a hydrophone line array, for example, a 40 hydrophone line array. The hydrophone line array may extend in a direction perpendicular to the direction of travel of the carriage assembly. The array may be connected to signal processing devices to provide a steerable 3 degree beam pattern (steering in the direction perpendicular to direction of travel, i.e., along the length of the line array).

The carriage may be held stationary during signal acquisition, and the position of the carriage may be determined and recorded, as will be further explained below. The carriage may then be moved a selected distance along a selected direction of travel. After the carriage has been moved the selected distance, signal acquisition may be repeated. The foregoing procedure may be repeated until the carriage has moved along the entire length of the template or beacon pattern (a "line" of acquisition), and then moved a selected distance in an orthogonal direction. Acquisition may continue as explained above in the original direction of travel after orthogonal motion of the carriage. The orthogonal motion may be repeated after completion of each acquisition line until signal acquisition is obtained over the entire area defined by the template or beacon pattern. The chirp projectors may be actuated in a sequence at a nominal rate of 75 Hz. A full swath may thus be realized at a nominal rate of 25 Hz. When a chirp projector emits its signal, data are recorded simultaneously on all hydrophones, in the line array, in a near vertical incidence receiver and in the two water bottom located orthogonal multi-channel linear receiver arrays. Some example embodiments may also include a novel chirp signal generation algorithm. Unlike general geophysical data acquisition and processing suites, the signal generation and processing parameters may be specifically selected for different water depth conditions, sub-seabed imaging of targets and so-called 'answer products'. The acoustic transmissions from the chirp projectors include a unique configuration of linearly frequency modulated chirps. In situations the transmitters are close to the water bottom there is insufficient travel path distance to the water bottom to enable a chirp signal to be sufficiently formed before ringing or reverberations form. To overcome such limitations each chirp may be divided into discrete sub-chirps or "chirplets." For example, if the total duration of the desired chirp is 24.75 ms, then to overcome strong water bottom reflected returns and strong energy reverberations in the water column, especially in shallow water and their undesirable interactions (e.g., one or more "notches" at certain frequencies in the received energy spectrum, the chirp may be segmented into, e.g., 10 chirplets, each 4.5 ms. Afterward reconstruction of the desired full bandwidth chirps may be obtained via "stitching" together of the detected acoustic energy resulting from the chirplets with a time overlap between successive chirplets. Pulse compression may be used and can either be matched or mismatched. Alternatively no pulse compression may be used. Matched pulse compression consists of cross-correlation of the raw data with the stitched chirplets. The mismatched pulse compression consists of filtering of raw data with a function, which after application to the stitched chirplets yields lower temporal side lobes. The reduction of side-lobe amplitude is obtained at the expense of widening of the main lobe. A compromise is established between main-lobe width and the relative amplitude of the side lobes. If, for example, the total duration of the sweep is 24.75 ms, then a modified partition of unity over the 24.75 ms interval is employed to break the entire sweep into chirplets. The modification of the partition of unity allows for tapering (i.e. on-ramp and off-ramp) of the generated sweep signal. The duration of the on-ramp or off-ramp of the entire sweep is necessarily shorter than half the duration of the chirplet. Hence, if it is desired to break the sweep into 10 chirplets (i.e. $\{c_1, c_2, \ldots, c_{10}\}$) with 4.5 ms duration each, then the modified partition of unity is defined as a collection of 10 functions $\{f_1, f_2, \ldots, f_{10}\}$ such that each $f_i$ is defined on the interval 0 to 24.75 ms, each $f_i$ is identically zero outside 4.5 ms interval, each $f_i$ ranges between 0 and 1 (i.e. $0 \le f_i \le 1$), and $|s_a(t)|(f_1+f_2+\ldots+f_{10})=|s'_a(t)|$, where $s'_a(t)$ is the analytic extension (via Hilbert transform) of the tapered sweep signal $s'(t)$, $s_a(t)$ is the analytic extension (via Hilbert transform) of the untapered sweep signal $s(t)$ (i.e. no on-ramp and off-ramp), and $|s_a(t)|$ and $|s'_a(t)|$ are the absolute values of the complex valued functions $s_a(t)$ and $s'_a(t)$. The constituting chirplets (i.e. $\{c_1, c_2, \ldots, c_{10}\}$) are then defined as, $c_1(t)=f_1(t)\cdot s(t)$, $c_2(t)=f_2(t)\cdot s(t)$, $\ldots$, $c_{10}(t)=f_{10}(t)\cdot s(t)$, where $s(t)$ is the untapered signal. If transmitter and sensor(s) are turned on simultaneously, then stitching the chirplets may be implemented, for example, by shifting the recorded signal(s), associated with chirplet $c_i$, by $\Delta t_i$, where $\Delta t_i$ is the time interval measured from $t=0$ until the first non-zero value of $f_i$. An example of the specific embodiment of the modified partition of unity can be formulated as follows. Define the tapered sweep signal to possess linear 2.25 ms on-ramp and 2.25 ms off-ramp tapers, with sweep duration of 24.75 ms, furthermore define a triangular window function, $w_{TRI}(t)$, on the interval 0 to 4.5 ms as, $w_{TRI}(t)=t/2.25$ on the interval 0 to 2.25 ms and $w_{TRI}(t)=-1/2.25\,(t-2.25)+1$ on the interval 2.25 to 4.5 ms, where t is measured in milliseconds. Then, the modified partition of unity is defined as, $f_1(t)=w_{TRI}(t)$ on the interval 0 to 4.5 ms and $f_1(t)=0$ outside of the interval, $f_2(t)=w_{TRI}(t-2.25)$ on the interval 2.25 to 6.75 ms and $f_2(t)=0$ outside of that interval, $f_3(t)=w_{TRI}(t-4.5)$ on the interval 4.5 to 9 ms and $f_3(t)=0$ outside of that interval, continuing in this manner the general formula for $f_i(t)$, where i ranges between 1 and 10, can be expressed as, $f_i(t)=w_{TRI}(t-2.25(i-1))$ on the interval $2.25(i-1)$ to $2.25(i+1)$ ms and identically zero outside of that interval.

Acoustic imaging may be performed using coherent summation of all recorded signals from the array over synthetic aperture lengths of about 4.5 m in the Y-direction (along the direction of motion of the carriage). Using such coherent summation the detected signals may be focused and an image may be generated. That is, in the across-track X-direction, the projector-hydrophone geometry is fixed, in which case coherent summation works the same way as would a conventional beam-former. However in the along-track direction, the projectors and hydrophones are operated repeatedly but in the same Y-position (position along the carriage direction of travel), thus enabling repetitive stacking of the received signals from identical geodetic positions. Projector operation as described above is repeated for a selected number of repetitions, the detected signals may be stacked at each such location, and then the carriage is moved to the next location along the Y-direction and stopped. The acquisition sequence described above may then be repeated.

The synthetic aperture created by the Y movement of a source at a distance, for example, $Y_0$ in combination with the array of receivers along the X axis of extent, for example, $X_0$ is a rectangle of sides $Y_0$ by $X_0$. The beam pattern of such an aperture created by the Y movement results in a beam pattern that would be associated with a physical aperture of $2Y_0$ by $X_0$ with a single transmitter. There is thus an asymmetry in the beam pattern in favor of a narrower beam angle in the YZ plane. This asymmetry may be considered when generating images using an acquisition technique explained further below.

Coherent summation may be performed over Y-direction travel lengths of, for example, about 4.5 meters. Such motion can yield a unique beam-former volume. In the across-track (X) direction, the angularity of the chirp projectors may be considered and may be adjusted to deliver a balance in the acoustic focusing in the center of the array (3°) and also as the signal reception is moved to the outer edges of the image volume boundary. Y-direction acoustic focusing is expected to be nearly constant at all ranges of interest (generally less than 30 meters depth sub-bottom). This is a result of the data "volumes" aperture gain, which is obtained by the above-described data gathering method that forms a "volume" at each acquisition position. Coherent summation over the described Y-direction aperture length of approximately 4.5 m contributes important signal-to-noise gains in the acoustic images. This is a significant factor in the overall sonar performance, especially if operated in poor ambient conditions, for example, ambient noise within the chirp projector bandwidth and the particular area of operation.

The acoustic data recording may use synchronized clocks to enable coherent stacking without further pre-processing. The near-projector hydrophone (referring to hereinafter as a "vertical incidence" sensor or receiver), bottom disposed orthogonal arrays of sensors and the line array in the vehicle of carriage may continuously stream their respective signals to a data recorder/processor. A data preprocessor may provide accurate geodetic positional data for each hydrophone by using output from position and orientation sensors disposed on the carriage and/or on the template grid at the time the acoustic data is recorded. This yields very precise geodetically referenced acoustic data without the need for an inertial navigation system. The recorded acoustic receiver data are thus ready for coherent summation as the signals stream in. A data processor may execute the coherent summation. Coherent summation may include the following operations:

1) filtering (e.g., digital) of the recorded data to within the operating bandwidth of the chirp transducers (a first-level ambient noise reduction step);

2) calculation of instantaneous signal amplitude and phase (the analytic signal);

3) linear frequency chirp pulse compression (to distinguish features in range); and 4) full complex coherent summation following synthetic aperture rules (accounts for beam patterns of projectors and hydrophones and contributes a second-level ambient noise reduction function). Another noise reduction function consistent with the present example method results from the stationary nature of the apparatus during signal generation and detection. There is no requirement for thrusters, motors, etc. to be operating during signal acquisition, however, these devices can start up between acquisitions to reposition the apparatus.

The above processing may be implemented as a general purpose computation on one or a network of graphics processing units ("GPUs"). The GPUs may be video processor devices, for example, those sold under the trademark NVIDIA® Tesla™ whose architectures lend themselves to a highly parallelized implementation of the coherent summation process. The current example implementation handles all needed computations for a full data volume once every 16 milliseconds using two NVIDIA® C2050 Tesla™ GPU processors). NVIDIA is a registered trademark of NVIDIA Corporation, San Tomas Expressway Santa Clara, Calif. 95050.

The acoustic image is then ready for computer display, for example on a plasma or LCD screen, to aid in moving the carriage to its next frame or data collection cell. The signals transmitted by the chirp projectors may be linear frequency modulated (LFM) chirps, with a frequency range of 4500 to 14500 Hz and 4.5 ms duration, providing a time-bandwidth product of 16.5 dB.

The above described first step in the signal processing chain may be simple application of a band pass finite-impulse response ("FIR") digital filter. Such filter is used for elimination of out-of-band interference signals. The filter may be implemented as a 0-phase, 48 tap, 4-15 kHz band pass filter. A FIR filter may provide the advantage of introducing no phase distortion, which is desirable for the focusing of beams in the processing, and it is computationally efficient for real-time applications.

Principal features of the example LFM chirp signal may include (i) generation of a linear frequency sweep for a fixed, pre-determined duration (as opposed to generation of a single tone for a fixed duration); and (ii) pulse compression using matched signal filtering (also referred to as a correlation filter).

Pulse compression may introduce side lobes in the illumination beam along the direction of travel of the carriage. For acoustic signal processing, characteristics of the pulse compression side lobes have a bearing on the contrast of features that are visible in the processed image. In this respect, in addition to frequency modulation, amplitude modulation of the LFM chirp signal is commonly used to obtain pulse compression side lobes more amenable to imaging requirements. It should be understood that a trade-off exists by reason of using amplitude modulation, in the form of loss of power in the chirp projectors' signal. An alternative implementation may be the transmission of an "unshaded" LFM chirp signal (no amplitude modulation), followed by the use of so-called mismatched pulse compression to obtain the equivalent of pulse compression with certain desirable characteristics. With the same data, one can then attempt different pulse compression strategies (with a view to optimize the sonar image result) without the need to repeat the data acquisition.

In the present example a mismatched pulse compression approach may be used. The reference signal is a 4,500-14,500 Hz, 4.5 milliseconds, −40 dB MSR (mainlobe-to-sidelobe energy ratio) pulse. The pulse compression may be implemented as a convolution operation, which may be performed in the frequency domain using fast Fourier transform (FFT) techniques for computational efficiency.

A full image swath of illumination from all the projectors may thus be realized at a nominal rate of 25 Hz. When an individual chirp projector emits its signal, signals are recorded simultaneously from all of the receivers. Acoustic signals are recorded simultaneously on spatially distributed sensors (e.g., the above-described hydrophones). Digital focusing may be performed in either the frequency domain, via fast Fourier transform (FFT) processing, or in the time domain, via time delay calculations. Generally, beam-forming wideband signals in the frequency domain is a complex and computationally intensive task. Alternatively, for wideband signals, a Hilbert transform approach affords an efficient and robust method for time delay calculations.

A real time signal x(t) may be sampled at regular intervals $t=k\Delta t$. The so-called analytic signal z(k) associated with x(k) is defined as:

$$z(k)=x(k)+jH\{x(k)\} \qquad (1)$$

where $j=\sqrt{-1}$ and $H\{\cdot\}$ denotes the Hilbert transform of the signal. The instantaneous amplitude A(k) and phase $\Phi(k)$ of the signal are given by the expression:

$$A(k)=|z(k)|, \phi(k)=\arg(z(k)) \qquad (2)$$

Since A(k) and $\Phi(k)$ are slow-varying in relation to x(k), a good estimate of the analytic signal at fractional time delays may be obtained by simple linear interpolation of the calculated instantaneous amplitude and phase.

At this stage of the data processing, the processor may calculate and store (in-memory) the analytic signals associated with the recorded data. The interpolation portion may be done on-demand at a later stage, if desired.

In order to generate meaningful images in one or more of the above described image volumes, a method of focusing the acoustic signals may be used. Focusing power is proportional to the apparatus' resultant antenna size. Formulating an acoustic lens of large proportions in the present example is based on the idea that a large lens or antenna can be realized by "hopping" a relatively small "volume" of acoustic data through space while accurately keeping track of geodetic position and attitude above the water bottom of the various projectors and receivers, so as to be able to digitally process the recorded signals as though they had been collected using a large, single lens with no motion of the carriage. To do this, it is assumed that the carriage assembly may be positionally or locationally (e.g., geodetically) precisely determined in time and in space, such that no significant phase errors are introduced into the signals.

The asymmetry of the beam as described above, for a given carriage assembly or vehicle position will be reduced in the beam pattern for a simulated large aperture as the number of positions increases if the direction of the Y movement of the carriage assembly or vehicle in relation to North is not maintained.

If the carriage assembly or vehicle is fixed to an arm on a crawler (e.g., as show in FIG. 1D) it can acquire the equivalent of three volumes by rotation of its turret at one crawler position: one forward, one position to the right and one position to the left. Then the crawler may be moved to a new position and the signal acquisition may continue in this "checkerboard" fashion.

The acoustic travel time (time-of-flight) to a voxel $v_i$ (i.e., a defined position in geodetic location and depth in the sub-bottom) from a chirp projector, and from the voxel $v_i$ to a particular hydrophone may be calculated using an assumed velocity profile modeled as layered-earth (e.g., using ray tracing). The analytic signal may be interpolated, and the result (complex-valued) may be summed into a signal output "bin" location associated with the voxel $v_i$. This is a possible implementation of the previously described coherent summation. The foregoing procedure may be repeated for as long as the carriage is in the general viewable area of each data volume. The viewable area may be defined along the direction of travel length of the swath of acoustic energy from the chirp projectors and transverse to the direction of travel by the limits of the beam steering pattern of the line array of hydrophones on the carriage (e.g., to a level of –dB from the line array response at the center of the line array of hydrophones). Regions of space associated with the true physical location of a sound reflector will have a proportionally greater signal sum (coherent signals) than regions of space where no meaningful acoustic scattering is taking place. At the end of the foregoing process, displaying the magnitude mean voxel sum for whole sections of each 3D image volume may provide an acoustic image of the sub-bottom within the area bounded by the positional termini of the carriage assembly.

The same process, using the instantaneous amplitude A(k) in place of the analytic signal z(k) yields what is referred to as an incoherent synthetic aperture beamformer. It is used as a sonar imaging technique when there is evidence that phase errors are too large for meaningful coherent summation.

Having explained in general terms the principle of obtaining "cellular" images of the sub-bottom, following is a more detailed description of example apparatus for obtaining signals for sub-bottom imaging.

FIG. 1A shows an example remotely operated vehicle (ROV) or autonomously operated underwater vehicle (AUV) hereinafter "vehicle" 10 disposed on the bottom of a body of water. The vehicle 10 may include a propulsion and directional control system 13 of any type known in the art. The vehicle 10 may include an umbilical cable UC if it is an ROV operated from above the water surface, or if the vehicle is an AUV, there may be no umbilical cable. The vehicle 10 may be propelled, for example, by tracks 13D driven by a motor (not shown separately) disposed in the propulsion and directional control system 13. The propulsion and directional control system 13 may include thereon a transponder TR used, as will be further explained with reference to FIGS. 2B, 2C and 2D, to determine a position of the vehicle 10 that can be precisely correlated to geodetic position thereof. The propulsion and directional control system 13 may include a boom 13A mounted thereto such that signal acquisition components, explained below, may be disposed at a selected elevation above the water bottom 9 and enables the signal, acquisition components to be moved precisely determinable distances along the length of the boom 13A. The signal acquisition components may include a vertical incidence receiver 16, e.g., a hydrophone mounted proximate one or more chirp projectors 14A, 14B, 14C. The foregoing component may be mounted on a frame 13B movable, for example, using wheels, on tracks 13AA mounted to the boom 13. Mounted proximate the base of the frame 13B may be a line array of acoustic receivers 20. The receivers in the line array 20 may be, for example, hydrophones. Programming of an AUV if used and/or remote operation of an ROV may include operating the propulsion and directional control system 13 to cause the vehicle 10 to move in selected incremental distances along a line, move a selected distance transverse to the line and repeat the incremental distance motion along a line transversely spaced from the first or previous line. In the present example, a direction that the boom 13A extends from the propulsion and directional control system 13 may be selectively rotated by mounting thereof to the tracks 13B using a turret 13C or similar device. How the turret may be used in signal acquisition will be further explained below with reference to FIG. 1D.

During survey operation, the vehicle 10 may be maintained at a fixed position, and the frame 13B may be stationary at a selected position along the boom 13A. The chirp projectors 14A, 14B, 14C, vertical incidence receiver 16 and line array 20 may be operated so as to acquire acoustic signals from below the water bottom 9. After such acquisition, the frame 13B may be moved a selected distance along the boom 13A, for example, 5 centimeters, and the signal acquisition process may be repeated. The foregoing may be repeated until the frame 13B has traveled the entire length of the boom 13A. A result, as shown in FIG. 1C is to acquire signals that can be processed as a synthetic aperture sonar SAS along the direction of motion or advance of the frame (13B in FIG. 1A) during the foregoing acquisition procedure.

Figure 1B:
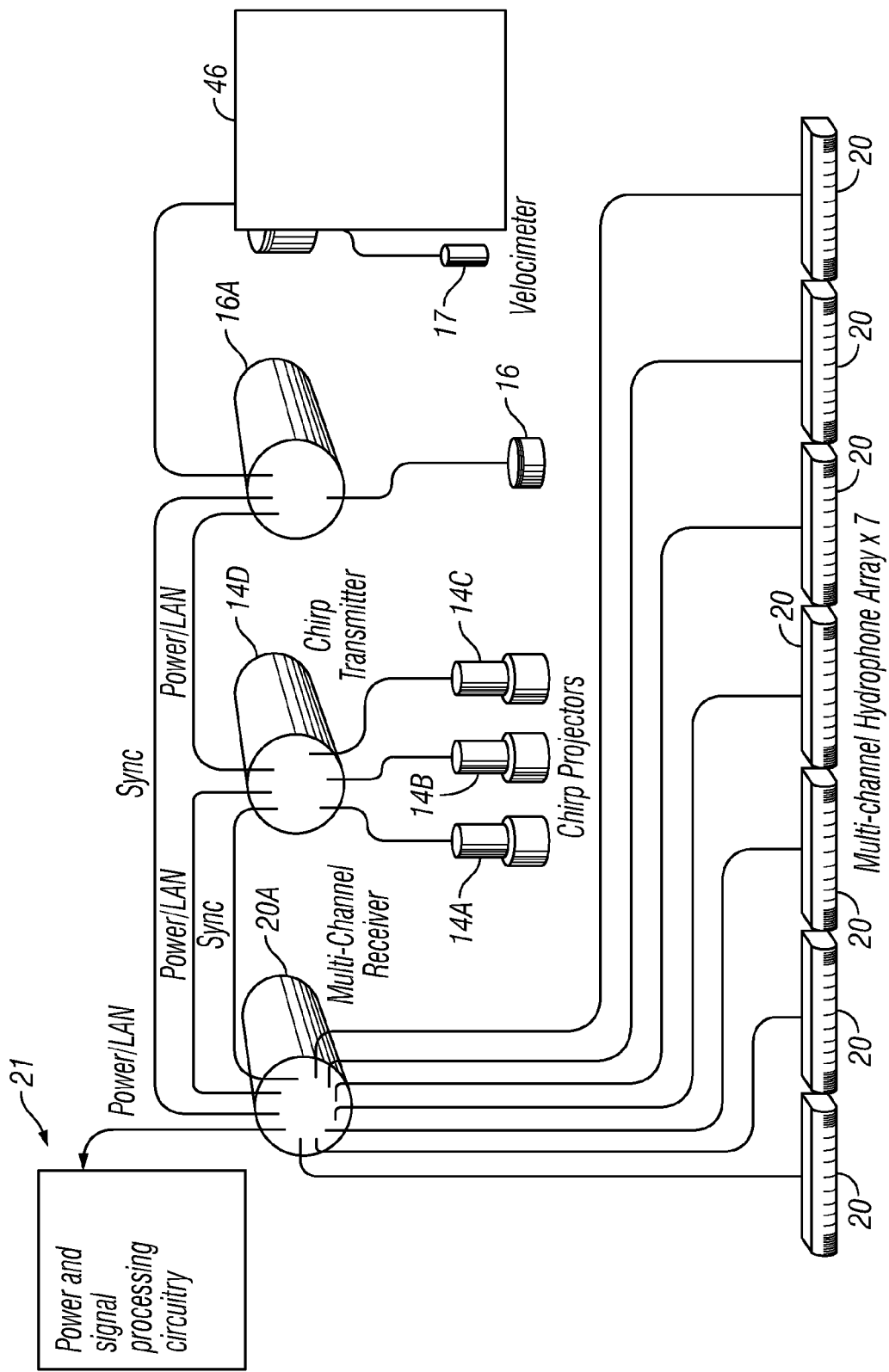
FIG. 1B shows example circuitry layout and acoustic transducers for use on the vehicle of FIG. 1A or a carriage shown in FIG. 2A

FIG. 1B shows example chirp projector and receiver circuitry. The chirp projectors 14A, 144B, 14C may be high power acoustic transducers as explained above. Circuitry to operate the chirp projectors 14A, 14B, 14C in swept frequency chirps as explained above may be disposed in a pressure resistant housing 14D, which may be mounted on the frame (12 in FIG. 1A). The vertical incidence receiver 16 may include circuitry in the same or separate 16A pressure resistant housing. The present example may include a water velocimeter 17 that may measure speed of sound in the body of water at selected times or substantially continuously. The line array of receivers 20 may be connected to a multichannel receiver circuit 20A disposed in a pressure resistant housing. Power, control and signal processing circuitry may be provided in a separate unit 21 therefor. The power, control and signal processing unit 21 may be disposed in a separate pressure resistant housing or in the same housing, for example, as the multichannel receiver 20A. The power, control and signal processing unit 21 may include connection to the surface by an umbilical cable if used with an ROV or a carriage assembly as will be explained below with reference to FIG. 2A, or may have batteries if used with an AUV. The power, control and signal processing unit 21 may include a separate processor (e.g., a programmable microprocessor—not shown separately) with a mass data storage unit, e.g., solid state or hard drive, for processing signals locally as explained above. Alternatively or in addition, partially or completely processed signals from the receivers 16, 20 may be transmitted to the surface in implementations that have an umbilical cable for such purpose.

Figure 1D:
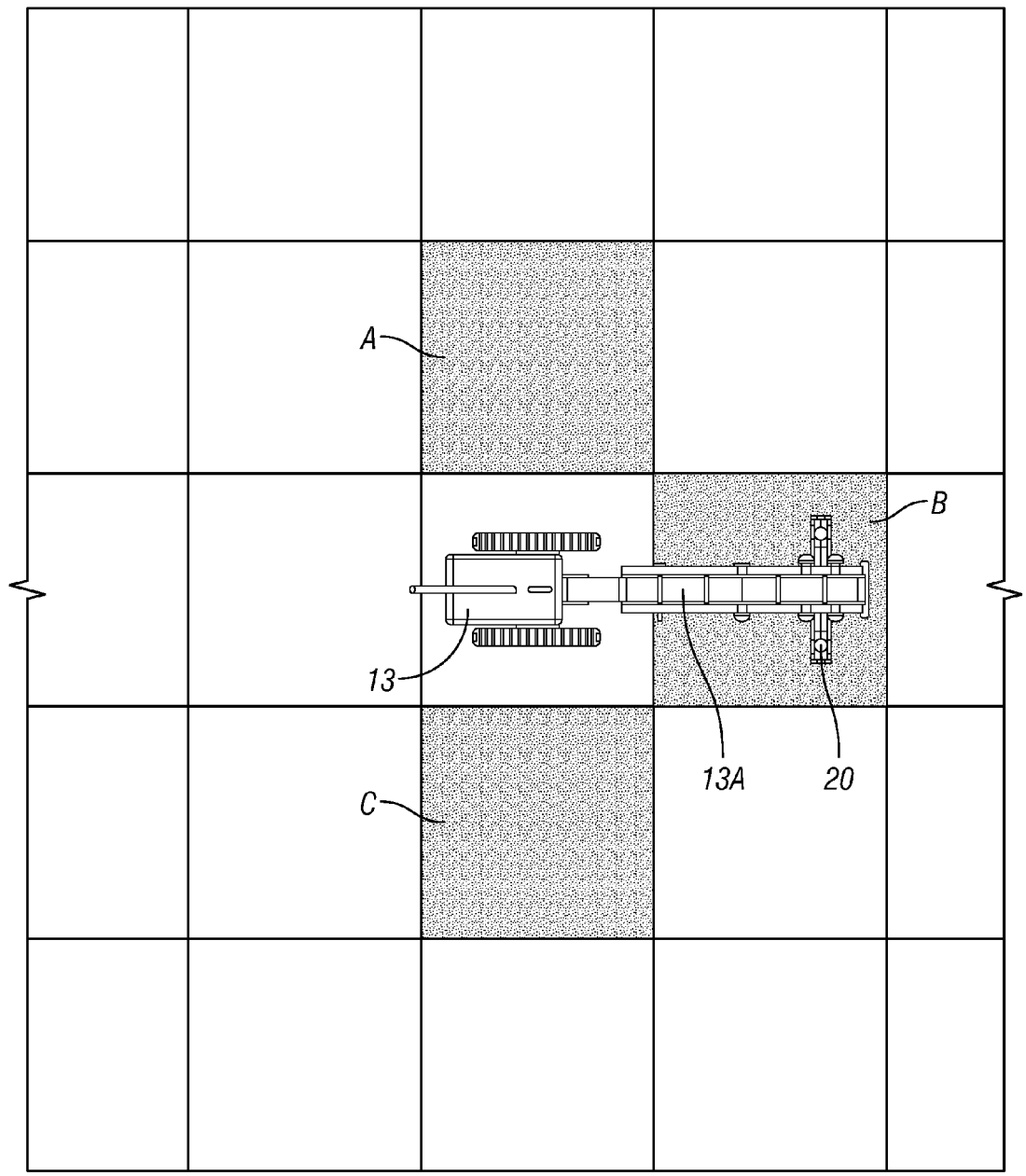
FIGS. 1D and 1E show an example acquisition technique that can be used with the vehicle of FIG. 1A.
Figure 1E:
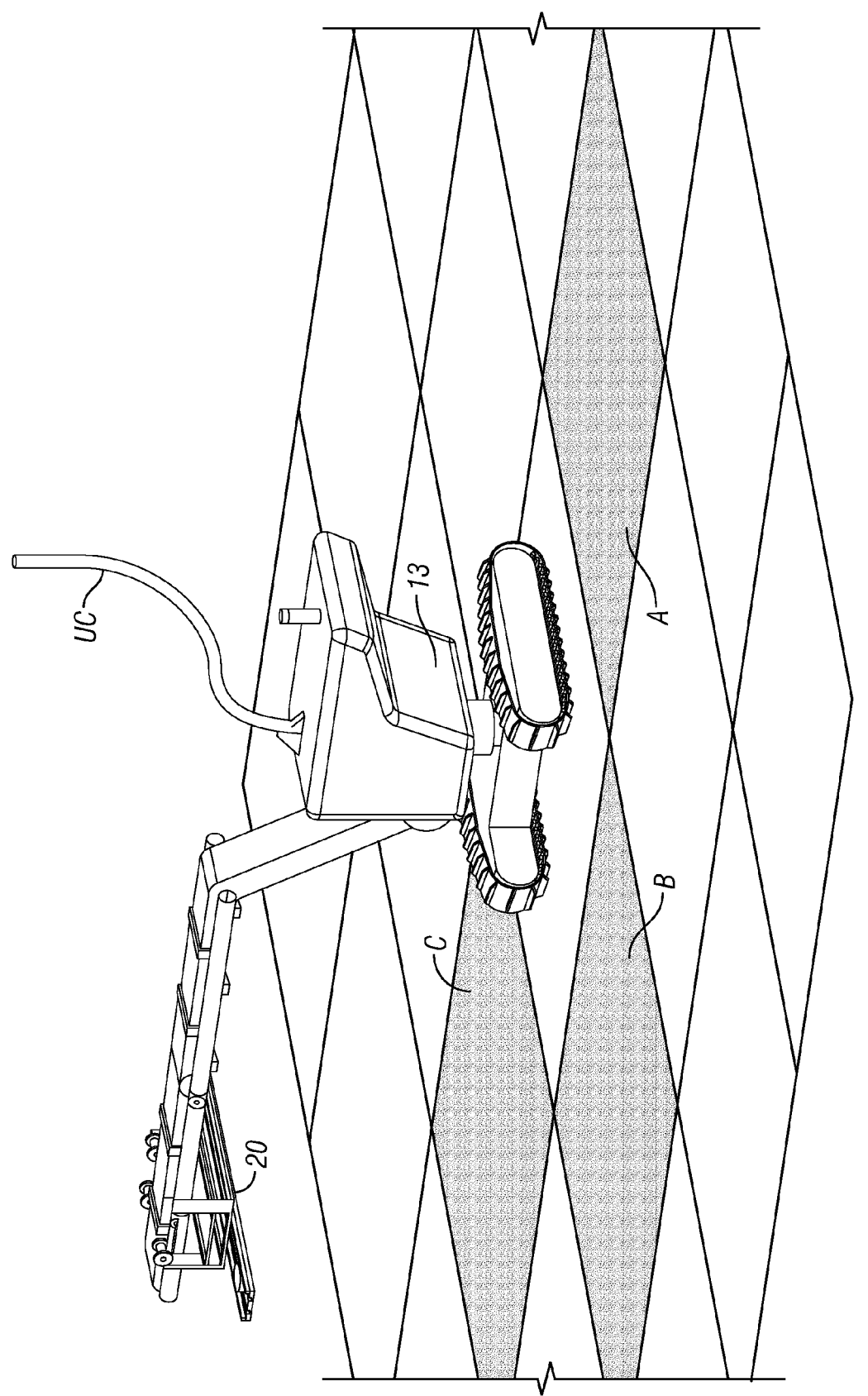

FIG. 1D shows an example acquisition procedure in which the propulsion and directional control system 13 is maintained at its position, and the turret 13C is rotated by 90 degrees to one side of the direction of motion of the vehicle 10, which in the present example may be substantially along a straight line. The frame 13B may be retracted, or alternatively moved incrementally as explained above, but in the opposite direction to that of the previous acquisition sequence, and the signal acquisition components may be operated so as to acquire similar sub-bottom acoustic signals as in the previous acquisition sequence, but above an area to one side of and behind (in the direction of vehicle travel) the previously covered area. After the foregoing acquisition sequence is completed, the turret 13 may be rotated so that the boom 13A extends in the opposite direction, and the foregoing acquisition sequence may be repeated, but in an area on the other side of the vehicle 10. After acquisition of sub-bottom signals for the three above-described areas, the vehicle 10 may be moved along the direction of travel, for example, by a distance substantially equal to the length traversed by the frame 13B as it is moved from one end of the boom 13A to the other end, and the three above-described areal acquisition sequences may be repeated. The water bottom areas covered when the vehicle is stationary are shown at A, B and C. An oblique view of the vehicle with the boom 13A rotated 90 degrees to the right from the direction of vehicle motion is shown in FIG. 1E. The area being surveyed is shown on the water bottom at C. It will be appreciated by those skilled in the art that the total length of motion of the frame (13B in FIG. 1A) on the boom and the length of movement of the vehicle 10 between each acquisition sequence will define the shape of the survey areas, A, B, C. While the illustrated areas appear to be square shaped, other shapes are possible, either with or without overlap of adjacent water bottom areas.

Figure 2A:
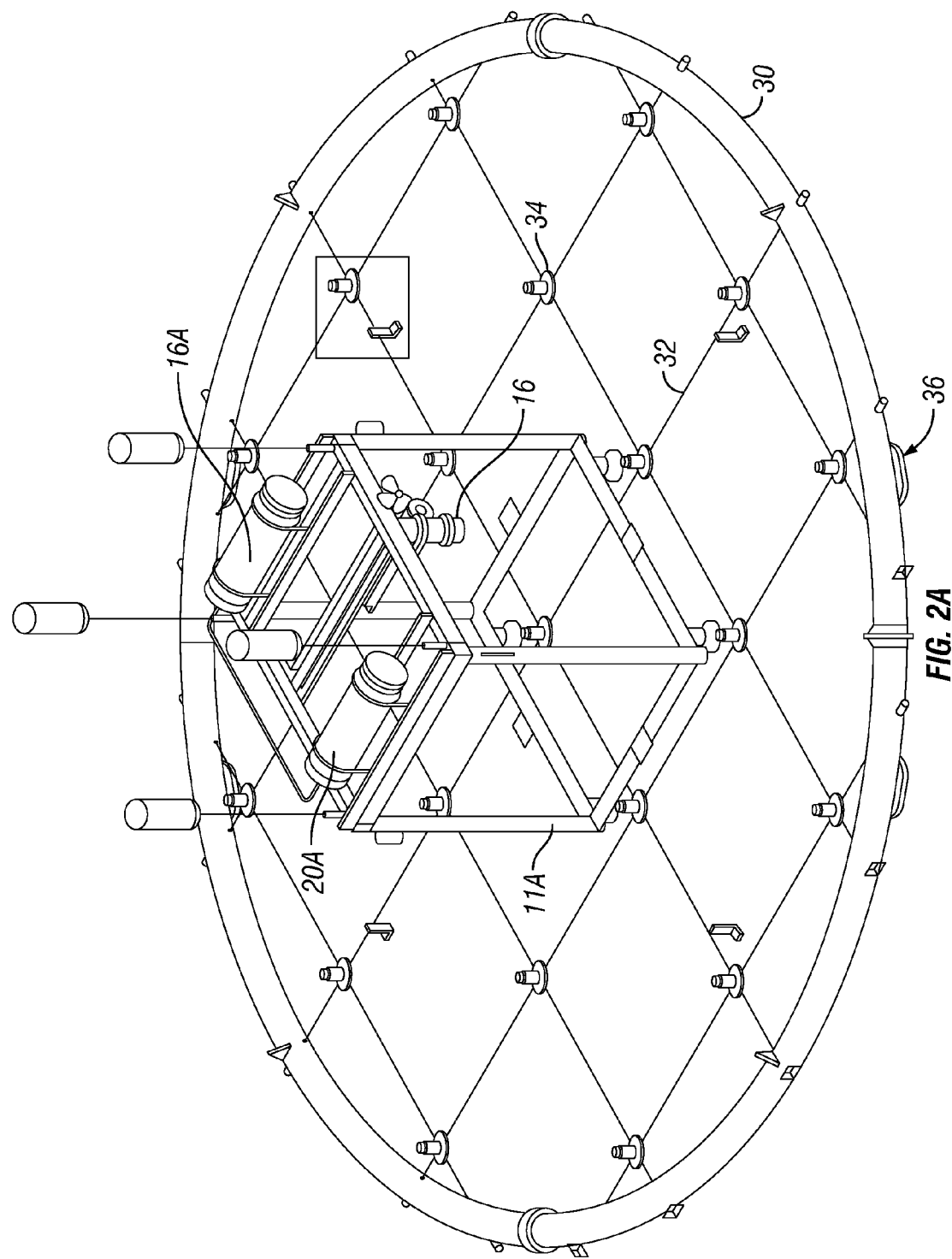
FIG. 2A shows an example template for positioning a signal acquisition carriage.

FIG. 2A shows an example of another type of vehicle, called a "carriage assembly", for supporting, moving and geodetically locating the various projectors and receivers described with reference to FIGS. 1A and 1B. A circular or other shaped support frame 30 may be configured to be deployed on the water bottom. Skids 36 may be used to level the frame 30 with reference to the water bottom or with reference to gravity. A grid of support cables 32 may be extended within the frame 30 to provide a guide track for motion of a carriage assembly 11A. The carriage assembly 11A may include the chirp projectors (14A, 14B, 14C in FIG. 1B), vertical incidence receiver 16, pressure resistant housing(s) 20A, 16A and other components shown in the example of FIG. 1B including the water velocimeter 17 and power, control and signal processing unit 21.

There may be a plurality of transponders 34 disposed at selected locations on the cable grid 32 and/or the frame 30. The transponders 34 emit signals and/or receive signals that correspond with signals received and/or emitted by the transponder on the vehicle (TR in FIG. 1A) to precisely determine position of the vehicle or carriage assembly 11A within and with reference to the frame 30.

The frame 30 may be deployed in the body of water by a winch or similar device and lowered to the water bottom. The precise geodetic position of the frame 30 may be determined using, for example, acoustic location devices known in the art that communicate with corresponding devices at the water surface, wherein a geodetic position signal receiver, such as a GPS receiver may be located. By precisely locating the frame 30 with reference to geodetic position, and by determining relative position within the frame 30 of the carriage assembly 11A or vehicle (10 in FIG. 1A), the precise geodetic position of the carriage assembly or vehicle and each of the chirp projectors and receivers thereon may be determined at any time. The carriage assembly 11A may be moved by a device deployed on the water surface or on a nearby land surface. Non-limiting examples of such devices may include cranes, excavators, barge deployed cranes and the like. An example of a device used to move the carriage assembly from a nearby land surface is shown in FIG. 2B.

Figure 3:
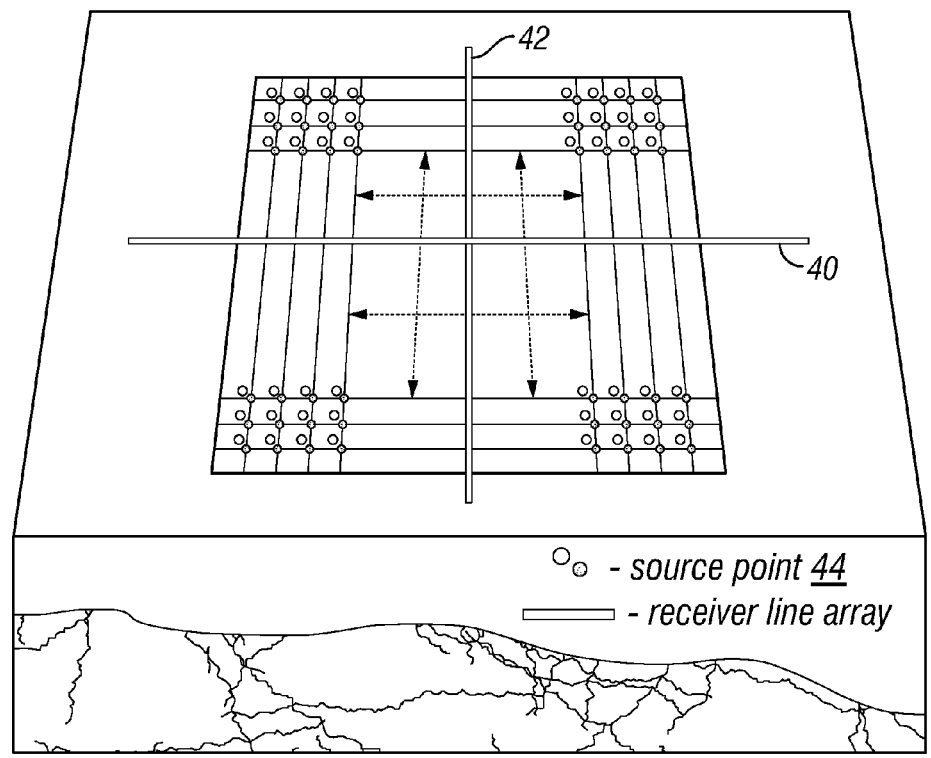
FIG. 3 shows an example of a pair of orthogonal receiver line array disposed on the water bottom.

As a practical matter, before deployment of the frame 30 and the carriage 11A or vehicle, two orthogonal line arrays of sensors, such as hydrophones, may be deployed on the water bottom, followed by the transponders The deployment of the frame 30 and the carriage 11A or vehicle follows the calibration of the transponders. An example of such line arrays is shown in FIG. 3 and will be explained in more detail below.

Determining geodetic position of the carriage or vehicle and the individual sensors in the line arrays (FIG. 3) using the location transponders 34 will now be explained with reference to FIGS. 2B, 2C and 2D. An example of an arrangement of $N_t+1=7$ location transponders 34 and the transponder on the vehicle or carriage assembly is shown in FIG. 2B. One of the location transponders 34 is located at a position defined as (0, 0, 0). One of the location transponders 34 is defined to be at position $(+x_1, 0, z_1)$. The foregoing one of the transponders 34 may have a steerable, narrow acoustic receiving beam. The other transponders 34 are placed on the water bottom roughly equally spaced and approximately on the circumference of a circle of radius $x_1$, avoiding the −ve x axis or they may be placed as shown in FIG. 2A at various positions on the frame (30 in FIG. 2A) or supporting cables (32 in FIG. 2A).

Figure 2B:
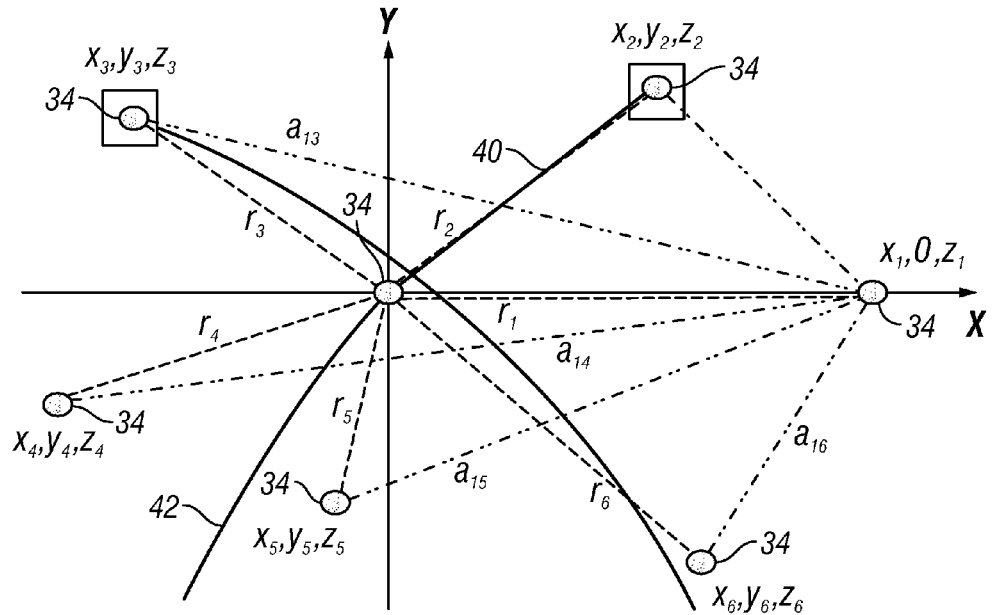
FIG. 2B shows an example of positioning transducers to calibrate position determination for the carriage of FIG. 2A.
Figure 2C:
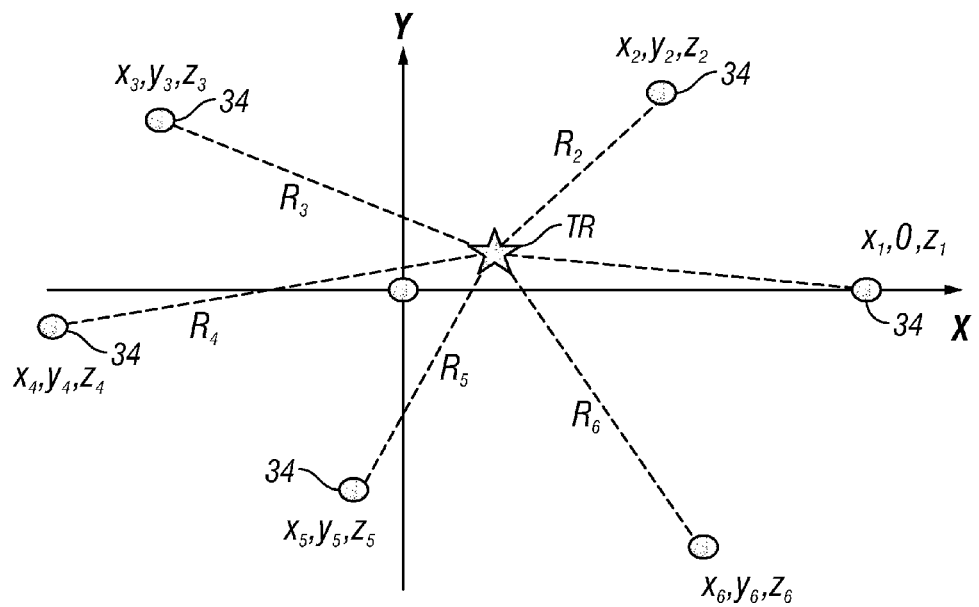
FIG. 2C shows an example of determining position of the carriage within the template.

The distances $r_i$, and $a_{ij}$ shown in FIG. 2B may be obtained from measured travel times of an acoustic signal through the water using the location transponders 34. The coordinates of the above referenced one of the location transponder 34 (transponder no. 1) are defined as.

$$y_1 = 0, x_1 = \sqrt{(r_1^2 - z_1^2)} \qquad (4)$$

Each of the travel times may be measured repeatedly and the mean value obtained over several minutes. The receiving transponder 34 in each case is the transponder at $(+x_1, 0, z_1)$ which has directional receiving capability. The narrow receiving beam is directed towards the transponder of interest.

The angle subtended between the X axis and geodetic north may be determined by transmitting from the transponder 34 at the origin (location (0, 0, 0)) and receiving the signal at the transponder 34 at $(+x_1, 0, z_1)$ and noting the angle measured by the latter transponder.

The distances $r_i$, i=1 to Nt are measured from the transponder at (0, 0, 0) to all the other transponders.

The values of $z_i$ at all transponders may be obtained from a depth sensor (not shown) associated with each transponder 34, averaged over several minutes.

The coordinates of the other transponders 34 are:

$$x_i = \frac{x_1^2 + r_i^2 + z_1^2 - 2z_1 z_i - a_{1,i}^2}{2x_1} \qquad (9)$$

$y_i = \sqrt{(r_i^2 - x_i^2 - z_i^2)}$ The sign of $y_i$ is obtained by noting the angle recorded by the direction of reception by the transponder at $(+x_1, 0, z_1)$.

Notice that the foregoing solution only uses $a_{1j}$. The $a_{ij}$, $r_i$ and $z_i$ are measured quantities and will have associated errors.

The values of $z_i$ may be obtained as a difference between the depth of the vehicle or carriage (using, for example a pressure sensor) and that of the transponders 34 measured using accurate depth sensors (e.g., pressure sensors).

Once the case of $a_{ji}$ has been used to obtain estimates of the values of $(x_i, y_i)$, such values can be used as starting values for further estimates of the values for $(x_i, y_i)$ using extra measurements of $a_{ij}$ and the equations:

$$0 = r_i^2 + r_j^2 - 2x_i x_j - 2y_i y_j - 2z_i z_j - a_{ij}^2 \qquad (10)$$

When i=1 the previous equations for $(x_i, y_i)$ apply. There are further equations that can be used when an initial set of $(x_i, y_i)$ values is provided.

$$x_j = \frac{A_{i+1,j} y_i - A_{i,j} y_{i+1}}{x_{i+1} y_i - x_i y_{i+1}} \qquad (11)$$

$$y_j = \frac{A_{i+1,j} x_i - A_{i,j} x_{i+1}}{x_{i+1} y_i - x_i y_{i+1}} \qquad (12)$$

wherein $$A_{ij} = \frac{1}{2}(r_i^2 + r_j^2 - 2z_i z_j - a_{ij}^2) \qquad (13)$$

In particular, the values of (i, j) may be restricted to (1, 2); (2, 3); (3, 4); (4, 5); (5,6) etc., so that the distances between adjacent transponders are used.

Sensors required both for tracking the position of the carriage assembly or vehicle and for the calibration of the line arrays are mounted on the carriage assembly or vehicle and consist of a directional receiver (transponder TR shown in FIG. 1A), a depth sensor, a compass and an omnidirectional transmitter (can also be part of transponder TR in FIG. 1A).

The transponders 34 may transmit onmidirectional signals. The directional receiver on the carriage or vehicle rotates (or is beam steered) and determines the angle between each of the transponders 34. The transponder on the carriage or vehicle directs its receiver to a particular transponder and measures the distance over several minutes by averaging time of flight measurements. The transponder receiver then rotates to determine the distance to another transponder until all the transponders are located. Because the carriage or vehicle can be disposed at a fixed position for an extended period of time, very accurate values of the $R_i$ and the $z_i$ can be determined.

The carriage or vehicle is at a position defined as (X, Y, Z) where X and Y are determined from the values of $R_i$ and the transponder 34 locations $(x_i, y_i, z_i)$. Z may be determined from a depth sensor (not shown) mounted on the carriage assembly or vehicle. With reference to FIG. 2C, because the coordinates of the location transponders 34 are known, the carriage assembly or vehicle position can be determined at any general position represented by (X, Y, Z) from the distances between the vehicle or carriage transponder and the transponders with the following equations.

$$R_i^2 = (x_i - X)^2 + (y_i - Y)^2 + (z_i - Z)^2 \qquad (14)$$

Because $y_1 = 0$, $$Y^2 = R_1^2 - (x_1 - X)^2 - (z_1 - Z)^2 \qquad (15)$$

$$X = \frac{C_{i+1} y_2 - C_i y_3}{2 y_i y_{i+1} (B_i - B_{i+1})} \qquad (16)$$

$$Y = (X B_i + C_i / (2 y_i)) \qquad (17)$$

in which $$B_i = \frac{x_1 - x_i}{y_i} \qquad (18)$$

$$C_i = x_i^2 - x_1^2 + R_1^2 - R_i^2 + y_i^2 + (Z - z_i)^2 - (Z - z_1)^2 \qquad (19)$$

where i=2 to $N_t$, where $N_t+1$ is the number of transponders, $R_i$, $Z_i$ and Z are measured quantities and the values of $x_i$ and $y_i$ are the transponder positions obtained in the calibration phase from measurements. Thus following the calibration of the transponder array there may be $N_t-2$ estimates of each of X and Y. The value of Z may be obtained from an accurate depth sensor, as previously explained. Essentially Z is the difference in height between the vehicle or carriage assembly at the origin during calibration and the position during surveying at any position (X, Y, Z).

Figure 2D:
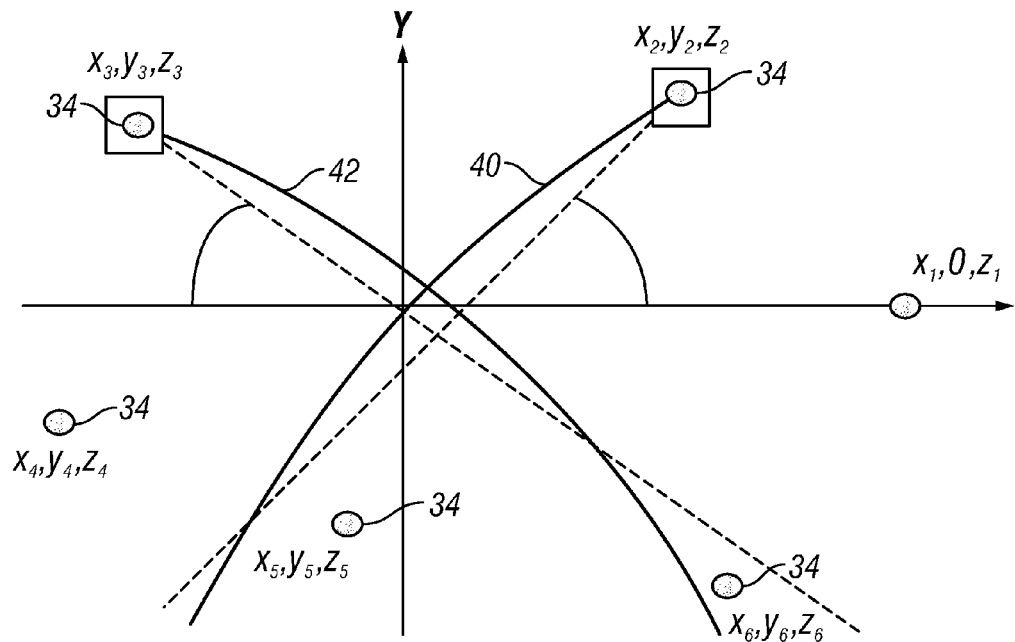
FIG. 2D shows an example of determining positions of sensors on line arrays deployed on the water bottom.

In FIG. 2D the line arrays 40, 42 are shown not as along a desired straight line but in a slight curve (somewhat exaggerated in FIG. 2D to illustrate the principle). The curve for an array may be described by the expression:

$$y = A\{(\cos(kx) - \cos(kx_i)) + (x - x_i)\tan(\theta) + y_i \qquad (20)$$

where $(x_i, y_i)$ are the coordinates of the end point of the line array (deployment starting point shown in FIG. 2B as squares). If the line array is in fact deployed along a straight line then k=0. Thus for each of the line arrays 40, 42 there are three parameters to be determined, A, k, θ.

The frequency of the omnidirectional transmitter portion of the transponder (TR in FIG. 1A) mounted on the carriage assembly or vehicle may be selected such that its wavelength is at least twice the sensor spacing on each of the line arrays 40, 42. At each position of the carriage assembly or vehicle, signals are received by the sensors on the line arrays 40, 42 from the vehicle or carriage assembly transponder, which transmits acoustic signals repeatedly while the vehicle or carriage assembly is stationary.

The output from an array is nearfield beamformed and steered to obtain a maximum. One method of obtaining the A, k, θ may be done from one position of the carriage assembly or vehicle using a Monte Carlo techniques. Another method uses signals from three well separated known positions of the carriage or vehicle, the nearfield beamforming and steering may use values of A, k, θ in a least squares optimization procedure to search for an overall maximum output, thus determining the values of the foregoing three parameters. Thus, the curve traversed by each line array may be determined, and the geodetic position of each sensor thereon may be determined using the determined curve for each line array 40, 42.

The present "cellular" acquisition and imaging method may be a combination of acquisition, signal processing, and interpretational techniques for subsurface heterogeneity delineation. The definition of heterogeneity is not restricted to, but is generally understood to constitute that volume of the sub-bottom which in response to seismic/acoustic/mechanical energy can redistribute the imparted energy in the direction of the recording instrumentation deployed at, near, or above the water bottom. More specifically, in order to obtain a precise image of the sub-bottom using the coherent stacking technique described above, it is desirable to have a precise model of the acoustic velocity distribution of the sub-bottom within the survey area. Following is an explanation of an example apparatus and method to obtain the acoustic velocity distribution.

The volume acquisition, as previously explained, may consist of partitioning a selected size (e.g., 50 meter by 50 meter) acquisition area into a collection of smaller areal subunits (e.g., approximately 3 meters by 3 meters, which may correspond to the size of the carriage). Once the frame (if used) and the carriage assembly are deployed at a specific location on the water bottom, precisely calibrated to geodetic position, the data acquisition and recording techniques described above may be initiated. The chirp projector locations are determined such that the entire survey area may "gridded" into a half-wavelength lattice. Typically, the chirp projectors are operated at 5 centimeter spacing (i.e., movement of the vehicle or carriage assembly) in the x and y local orthonormal reference frame. The orientation of the local orthonormal reference frame with respect to the geodetic reference frame may be known from detailed pre-survey calibration performed as explained above.

The volume acquisition method is designed, via synchronized clocks (e.g., to accuracy not exceeding 10 microseconds of deviation) to use two distinct sets of receivers to record the coherently scattered wavefield. That is, the vertical incidence receiver (16 in FIG. 1A) may be mounted adjacent to the projectors 14A, 14B, 14C as shown in FIGS. 1A and 1B, respectively. The vertical incidence receiver and the chirp projectors form a 'normal incidence' source-receiver couplet.

In addition to the vertical incidence receiver, two full multichannel receiver line arrays may also be deployed on the water bottom. These are deployed, spatially calibrated (e.g., using transponders and time of flight measurements as explained with reference to FIGS. 2B, 2C and 2D), and are actively acquiring signals during the entire signal recording procedure. Generally, the two orthogonal line arrays are positioned along straight lines at a 90° relative angular separation. The diagram in FIG. 3 illustrates the acquisition geometry of the line arrays 40, 42 and the normal incidence projector-receiver pair at each acquisition position of the carriage or vehicle.

Therefore, at any time, a scattered wavefield is detected by the vertical incidence receiver as well from each receiver on each of the two water bottom line arrays 40, 42. The plurality of all the recorded scattered energy comprises a complete data set for velocity distribution determination as well as heterogeneity imaging. The complete data set may be divided into 3 subsets. The first subset may consist of all the recorded energy except for that detected by the two line arrays 40, 42 deployed on the water bottom (i.e., the energy detected by the vertical incidence receiver). The second subset may consist of recordings of all the energy detected by the multichannel line arrays 40, 42 while the chirp projectors are disposed directly above each line array 40, 42. The third subset may consist of all recordings of receiver signals from the line arrays 40, 42 alone.

The subset of the complete data set consisting of all recording acquired along the multichannel line arrays 40, 42 while the chirp projector is disposed directly above each line array constitutes a data set suitable for conventional two-dimensional (2D) seismic data processing. This data set, through processing and interpretation, can provide two, 2D sub-bottom velocity models as well as respective seismically-derived stratigraphic models. Each of the two, 2D data lines may be processed independently of each other, but on the scale of the imaged volume, a three-dimensional (3D) stratigraphic and velocity model may be determined by interpolation.

Typically, the water bottom deployed receiver lines 40, 42, are at least 80 meters long for a 50 meter by 50 meter image area. The geometry of the volumetric acquisition simulates two independent 2D lines, angularly spaced approximately 90° apart as shown in FIG. 3. However, the relative angular separation of the two lines 40, 42 may be arbitrary whenever greater than 60°.

Figure 4:
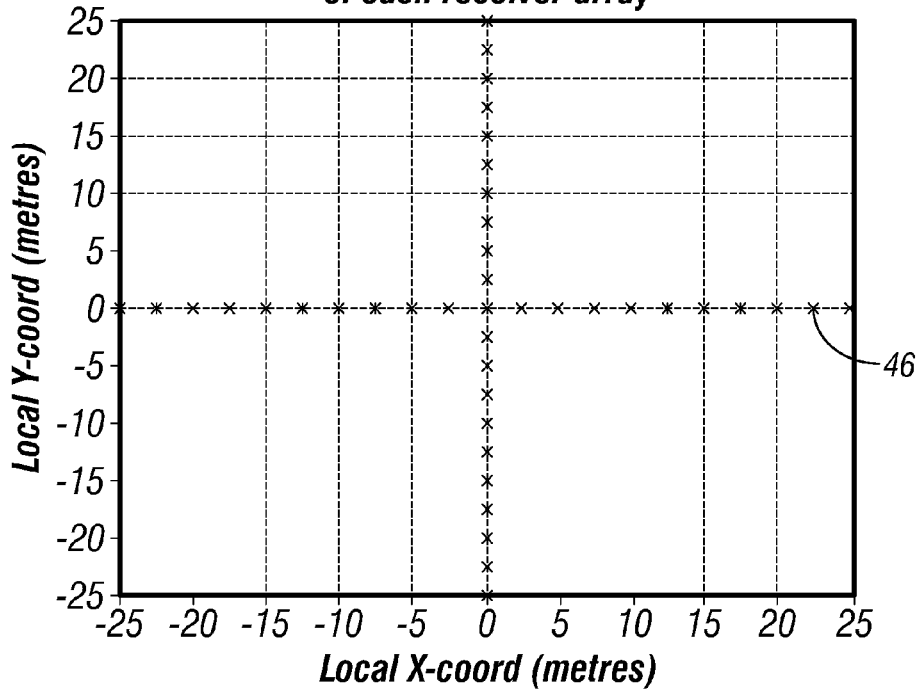
FIG. 4 shows a plan view of select common mid point ("CMP") image bins along each of the orthogonal line arrays shown in FIG. 3.

In the present data subset, each line comprises a sequence of carriage or vehicle (and thus chirp projector) positions as the carriage or vehicle moves over, and is thus in near vertical angular vicinity of the line array receiver locations. The data manipulation/imaging sequence of the present subset corresponds to pre-stack processed conventional 2D seismic lines. That is, each common-mid-point (CMP) image or output bin along each of the receiver lines 40, 42, as shown in FIG. 4, only contains signals acquired with the chirp projectors and receivers along that line.

For each of the two receiver lines 40, 42, various data processing protocols may be used; in particular, most migration routines known in the art may be used. Post-stack migration is generally used to establish a first estimate stratigraphic model and an initial velocity model. Subsequently, iterative pre-stack migration processing may be applied until sufficient convergence is obtained, through refinement of the velocity model.

Figure 5:
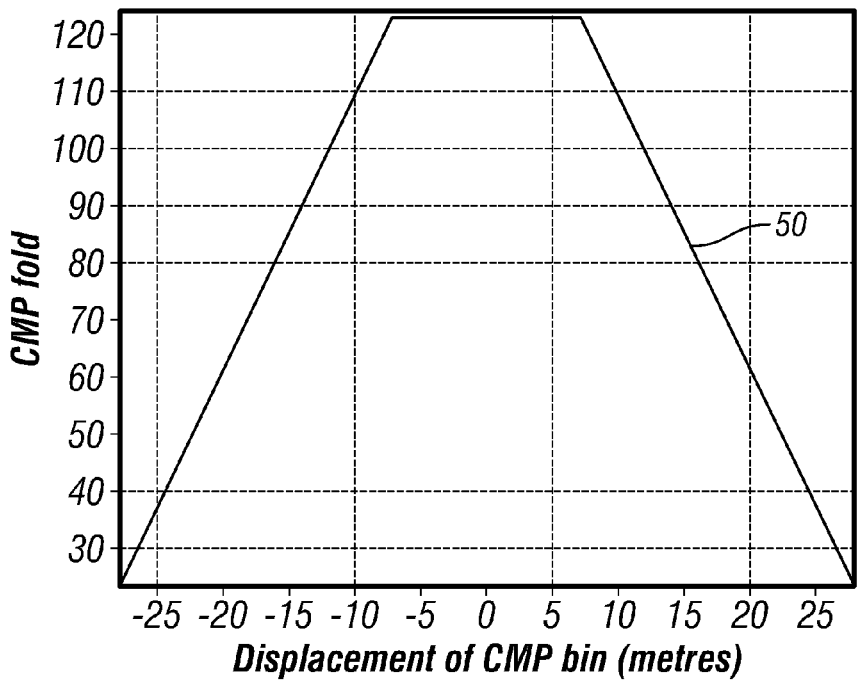
FIG. 5 shows a curve representing the number of signal "traces" written to each CMP bin. The ordinate number represented by the curve represents the stacking fold.

Typically, the map of chirp projector locations (i.e. map of x and y coordinates where z is understood to represent the elevation from a pre-defined datum) forms a uniform Cartesian grid when the carriage or vehicle is moved as explained above, with a grid spacing of 5 centimeters. Each of the receiver lines 40, 42 may form a linear array with an example receiver group spacing of 42 centimeters. Curve 50 in FIG. 5 shows the number of traces per each CMP bin location between −25 meters and 25 meters, where 0 represents the center of the local x-y reference plane of the acquisition volume, for receiver line length of 80 meters, chirp projector spacing of 5 centimeters and receiver group spacing of 42 centimeters.

Figure 6:
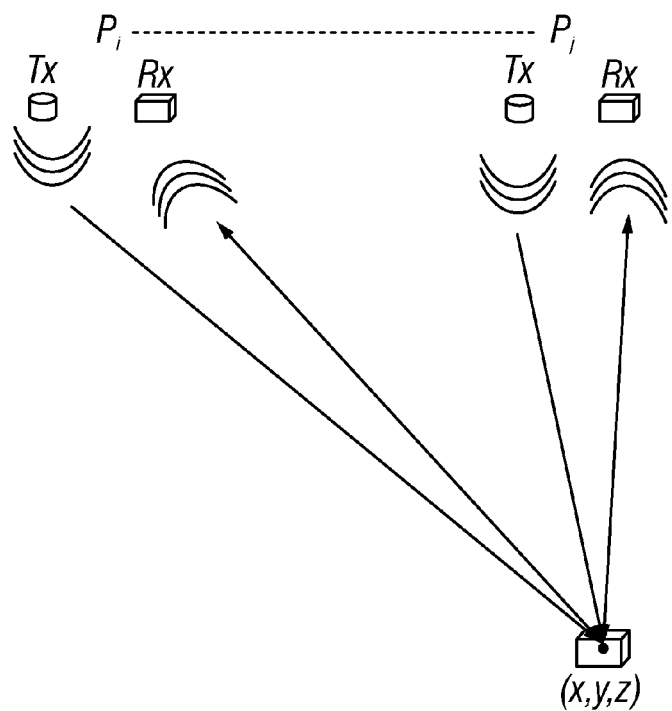
FIG. 6 shows geometry of 'normal-incidence' scattering of acoustic energy at a sub-bottom position defined by (x, y, z). Two example locations, $P_i$ and $P_j$ of an acoustic receiver, Rx, and transducer, Tx, couple are shown in the figure.
Figure 7:
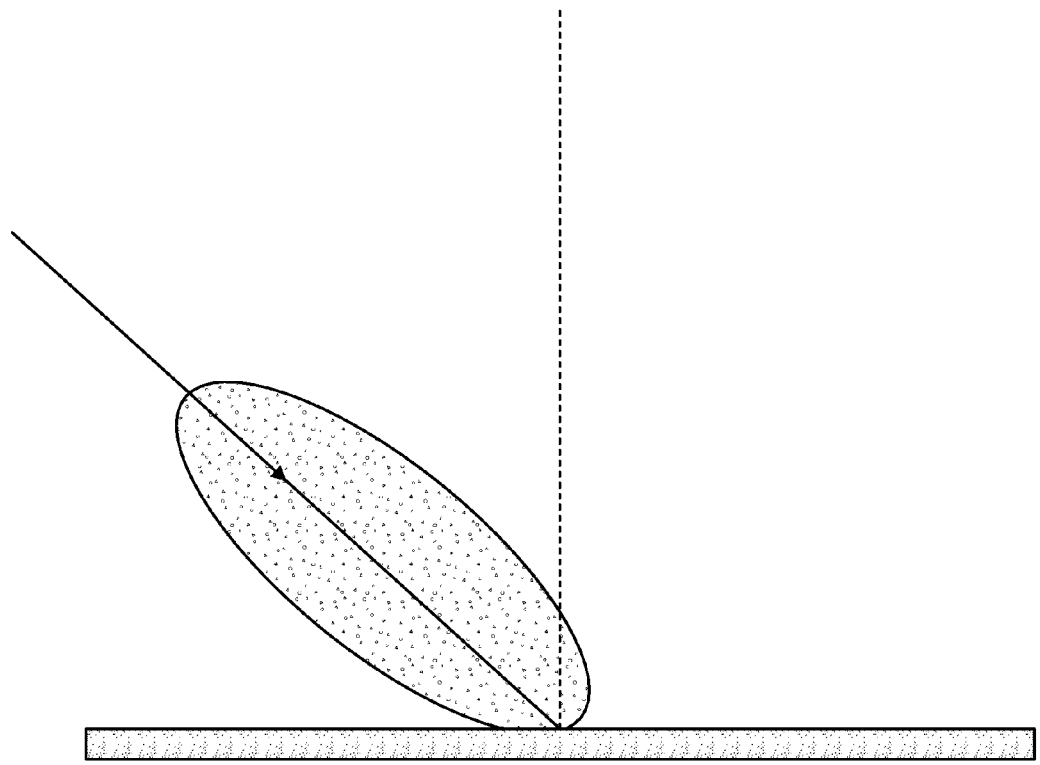
FIG. 7 shows a Henyey-Greenstein model of backscattering phase function. The phase function is associated with local volumes exhibiting strong bias toward backscatter rather than forward scatter.

The second subset of the complete dataset, consisting of all the 'normal-incidence' recordings acquired by vertical incidence receiver, as shown in FIG. 6 and FIG. 7, is processed based on phased array near-field beamforming protocols known in the art. In particular, for each sub-bottom (x, y, z) location the total travel-time is computed from each chirp projector location to the specific sub-bottom point of interest and back to the vertical incidence receiver. The total two-way travel time, using the velocity model as obtained through the conventional 2D prestack migration described above, may be obtained for any necessary time corrections. The two way travel times may be computed by approximate methods such as ray-tracing or by solving the full elastodynamic wave equation via finite-difference or finite-element or combinations thereof.

It will be appreciated by those skilled in the art that the angle subtended from vertical by the possible sub-bottom locations of the beam steering may enable overlap of sub-bottom locations within different volumes traversed by the acquisition equipment disposed just above the water bottom. The overlap of sub-bottom locations make possible repeated acoustic examination of the same voxel in the sub-bottom from different angles and directions, particularly if the above described "checkerboard" acquisition technique is used. Thus, having multiple acoustic signals directed from some voxels, the image resolution may be substantially enhanced at depths of as much as 50 meters as contrasted with synthetic aperture sonar imaging techniques known in the art.

Additionally, the present method allows for a spatially variable filter to be applied to each contributing signal recording ("trace"), or a temporally "windowed" subpart, prior to the final beamformer summation. The foregoing filter may be a function of sub-bottom location, location of the chirp projector, and location of the receiver. Such function enables design of volumetric filter to enhance specific backscatter properties while suppressing other information.

In essence, this second subset of the complete data set and the associated beamforming processing protocols may be used for imaging local heterogeneities exhibiting strong backscatter as modeled by, for example, Henyey-Greenstein backscattering.

Figure 8:
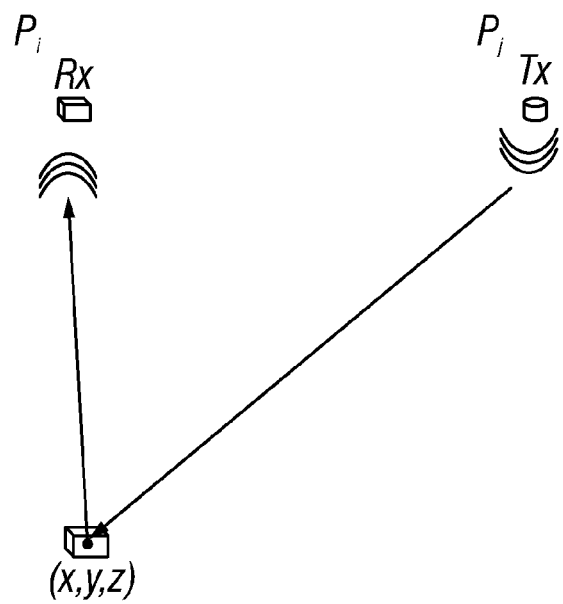
FIG. 8 shows an example of ray-based geometry of forward scattering of imparted acoustic energy by a local acoustic heterogeneity located at a sub-bottom position defined by (x, y, z).
Figure 9:
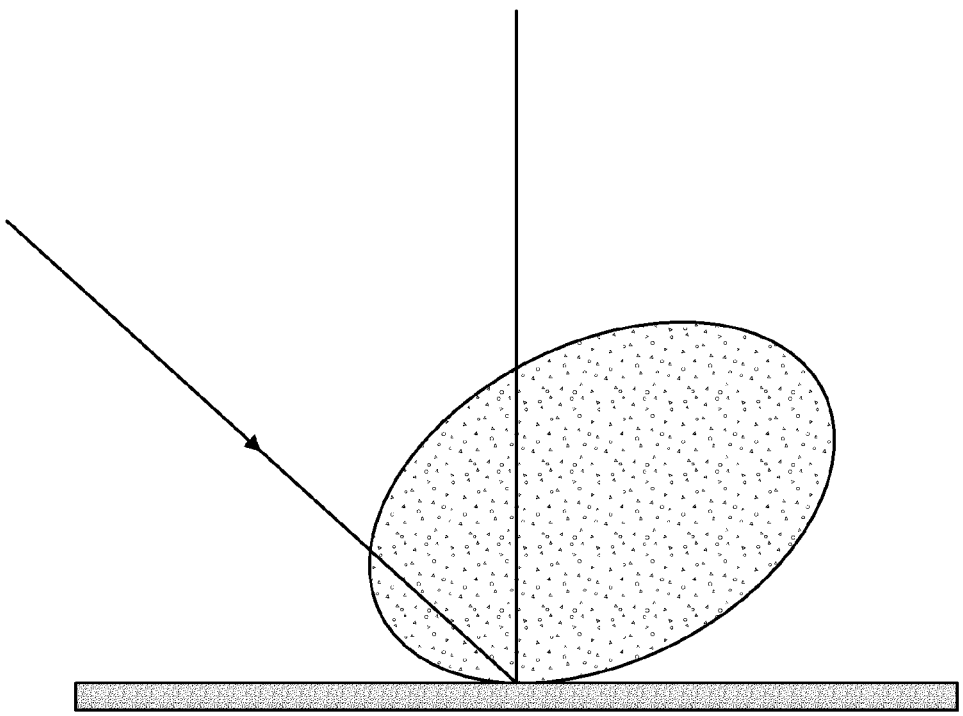
FIG. 9 shows a Henyey-Greenstein model of forward-scattering phase function. The phase function is associated with a local volume exhibiting strong bias toward forward-scatter rather than backscatter.

The third subset of the complete data set consists of all the recordings as acquired by all the receivers/receiver groups along the two linear receiver arrays (40, 42 in FIG. 3) deployed on the water bottom. The present subset of the complete data set is distinct from the previously described datasets, in that, unlike conventionally processed data, the present subset uses signals from the receivers on both line arrays to form an attribute image of the subsurface. Also, unlike the backscattering imaging described above, the present subset is intended to accentuate the subsurface scattering with bias toward forward scatter. The scattering ray-based geometry and an example of a scattering phase function are shown in FIGS. 8 and 9 respectively.

The processing of the present subset of the complete dataset may use the same physical, computational, and mathematical protocols as described above in the processing of backscattered energy.

After determining a velocity distribution model for the sub-bottom in the survey area as explained above, such velocity model may be used with the voxel values obtained as explained above to generate a high resolution image of the sub-bottom in the survey area. This may be accomplished by re-processing "normal incident" collected data, again using phased array nearfield beamforming with the new velocity model as input to the processing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A sub-bottom sonar imaging apparatus, comprising:
a carriage assembly having mounted thereon at least one acoustic transmitter, at least one acoustic receiver mounted proximate the transmitter;
a line array of acoustic receivers mounted on the carriage assembly in a direction transverse to a direction of motion of the carriage assembly;
a position determining transponder mounted on the carriage assembly;
a plurality of position determining transponders disposed at spaced apart positions and configured to communicate with the transponder mounted on the carriage assembly;
at least two line arrays of acoustic receivers disposable substantially orthogonally on the bottom of a body of water;
means for moving the carriage assembly to selected positions above the water bottom; and
a signal detection and processing unit configured to coherently stack and beam steer signals detected by the line array of acoustic receivers mounted on the carriage assembly, the signal detection and processing unit configured to record signals detected by the line arrays of acoustic sensors deployable on the water bottom and signals detected by the at least one acoustic receiver mounted on the carriage assembly.

2. The sub-bottom sonar imaging apparatus of claim 1 further comprising a frame deployable on the water bottom, the frame having a grid of support cables thereon, the carriage assembly configured to move along the grid of support cables.

3. The sub-bottom sonar imaging apparatus of claim 1 wherein the means for moving comprises at least one of a remotely operated underwater vehicle and an autonomously operated underwater vehicle.

4. The sub-bottom sonar imaging apparatus of claim 3 wherein the at least one of a remotely operated underwater vehicle and an autonomously operated underwater vehicle comprises a boom extending therefrom, wherein the at least one acoustic receiver mounted proximate the transmitter and the line array of acoustic receivers are movably mounted on the boom.

5. The sub-bottom sonar imaging apparatus of claim 4 further comprising a sensor for determining position of the at least one acoustic receiver mounted proximate the transmitter and the line array of acoustic receivers with reference to the boom.

6. The sub-bottom sonar imaging apparatus of claim 4 wherein the vehicle comprises means for rotating the boom to a selected rotary orientation.

7. The sub-bottom sonar imaging apparatus of claim 1 wherein the at least one acoustic transmitter comprises a chirp projector.

8. The sub-bottom sonar imaging apparatus of claim 7 further comprising three chirp projectors arranged on the carriage assembly to emit acoustic energy in a predetermined pattern along the water bottom.

9. The sub-bottom sonar imaging apparatus of claim 1 wherein the signal detection and processing unit further comprises means for determining a sub-bottom velocity model from signals detected by the at least two line arrays and signals detected by the at least one acoustic receiver proximate the at least one acoustic transmitter.

10. A method for imaging formations below the bottom of a body of water, comprising:
- imparting acoustic energy into the formations along a predetermined length swath at a selected geodetic position using at least one acoustic transmitter mounted to a carriage assembly;
- detecting acoustic energy reflected from the formations along a line parallel to the length of the swath at the selected geodetic position using a line array of acoustic receivers mounted to the carriage assembly;
- detecting acoustic energy reflected from the formations using at least two substantially orthogonal line arrays of acoustic receivers deployed on the bottom of the body of water;
- moving the selected geodetic position a selected distance transverse to the length of the swath;
- repeating the imparting acoustic energy, detecting acoustic energy and moving the selected geodetic position until a selected distance transverse to the length of the swath is traversed;
- coherently stacking the detected acoustic energy from all the selected geodetic positions; and
- beam steering the detected acoustic energy to each of a plurality of depths and positions along the length of the swath to generate an image for each such depth and position.

11. The method of claim 10 further comprising (a) moving the position of imparting acoustic energy a selected distance along the length of the swath, and (b) repeating the imparting acoustic energy, detecting acoustic energy, moving the geodetic position transversely to the length of the swath, and repeating (a) and (b) until a selected area of the water bottom has been traversed.

12. The method of claim 11 further comprising:
(c) detecting acoustic energy reflected from the formations at a plurality of positions using the at least two substantially orthogonal line arrays of receivers disposed on the water bottom;
(d) beam steering the detected acoustic energy, as defined in (c), to each of a plurality of depths and positions to generate an image for each such depth and position, to enhance forward scatter of the sub-bottom;
(e) detecting acoustic energy reflected from the formations at a position proximate the position of imparting acoustic energy;
(f) beam steering the detected acoustic energy, as defined in (e), to each of a plurality of depths and positions to generate an image for each such depth and position, to enhance backscatter of the sub-bottom;
(g) detecting reflected acoustic energy at each time when the position of imparting acoustic energy is coincident with a position of each receiver in the orthogonal arrays;
(h) processing the data, as defined in (g), by enhancement of specular reflections to obtain a velocity model of the sub-bottom;
(i) generating a model of acoustic velocity distribution using the detected acoustic energy from each of (c) through (h); and
(j) using the acoustic velocity distribution model to correct the images generated from the beam steered, coherently stacked detected acoustic energy.

13. The method of claim 10 wherein the moving of the selected geodetic position comprises:
- determining a geodetic position of the carriage assembly;
- extending a frame along a boom extending laterally in a selected direction from the carriage assembly by a selected amount, the frame having mounted thereon a least one acoustic transmitter and a line array of acoustic receivers oriented transversely to a direction of the boom; and
- repeating the imparting acoustic energy, detecting acoustic energy and extending the frame until a selected distance transverse to the length of the swath is traversed.

14. The method of claim 13 wherein the determining geodetic position of the carriage assembly comprises determining acoustic energy travel time between a transponder disposed on the carriage assembly and a plurality of spaced apart transponders disposed proximate the water bottom.

15. The method of claim 13 further comprising rotating the boom substantially transversely to a first side of the selected direction and repeating the extending, the imparting acoustic energy, detecting acoustic energy and extending the frame until a selected distance transverse to the length of the swath is traversed.

16. The method of claim 14 further comprising rotating the boom substantially to a second side of the selected direction and repeating the extending, the imparting acoustic energy, detecting acoustic energy and extending the frame until a selected distance transverse to the length of the swath is traversed.

17. The method of claim 16 further comprising moving the carriage assembly in a selected direction, returning the boom to the selected direction and repeating the extending, the imparting acoustic energy, detecting acoustic energy and extending the frame until a selected distance transverse to the length of the swath is traversed.

18. The method of claim 17 further comprising rotating the boom substantially transversely to a first side of the selected direction and repeating the extending, the imparting acoustic energy, detecting acoustic energy and extending the frame until a selected distance transverse to the length of the swath is traversed.

19. The method of claim 18 further comprising rotating the boom substantially to a second side of the selected direction and repeating the extending, the imparting acoustic energy, detecting acoustic energy and extending the frame until a selected distance transverse to the length of the swath is traversed.

* * * * *